(12) United States Patent
Hayashi et al.

(10) Patent No.: US 8,358,353 B2
(45) Date of Patent: Jan. 22, 2013

(54) IMAGE INPUT APPARATUS, IMAGE VERIFICATION APPARATUS, AND CONTROL METHODS THEREFOR

(75) Inventors: Junichi Hayashi, Kamakura (JP); Nobuhiro Tagashira, Nagareyama (JP); Kazuya Kishi, Kawasaki (JP); Yasuhiro Nakamoto, Kawasaki (JP); Yoshiharu Imamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 108 days.

(21) Appl. No.: 13/009,164

(22) Filed: Jan. 19, 2011

(65) Prior Publication Data

US 2011/0199501 A1  Aug. 18, 2011

(30) Foreign Application Priority Data

Feb. 18, 2010  (JP) .................................. 2010-034105
Dec. 10, 2010  (JP) .................................. 2010-276389

(51) Int. Cl.
| | |
|---|---|
| *H04N 5/228* | (2006.01) |
| *H04N 5/235* | (2006.01) |
| *H04N 5/225* | (2006.01) |
| *H04N 5/262* | (2006.01) |
| *H04N 5/222* | (2006.01) |
| *G06K 9/32* | (2006.01) |

(52) U.S. Cl. ................. 348/222.1; 348/221.1; 348/239; 348/218.1; 348/333.02; 382/294; 382/284

(58) Field of Classification Search ................. 348/362, 348/221.1, 294, 302–306, 222.1, 239, 218.1, 348/172, 333.05, 333.02, 333.12, 207.1; 382/284, 274, 294, 218
See application file for complete search history.

(56) References Cited

U.S. PATENT DOCUMENTS

| | | | |
|---|---|---|---|
| 5,499,294 A | 3/1996 | Friedman | |
| 6,204,881 B1 * | 3/2001 | Ikeda et al. | ................... 348/362 |
| 7,239,805 B2 * | 7/2007 | Uyttendaele et al. | ......... 396/222 |
| 7,817,186 B2 * | 10/2010 | Tamamura | ............... 348/208.12 |
| 8,228,400 B2 * | 7/2012 | Liu et al. | ....................... 348/239 |

FOREIGN PATENT DOCUMENTS

| | | | |
|---|---|---|---|
| JP | 2006-174026 A | | 6/2006 |
| JP | 2006174026 A | * | 6/2006 |

* cited by examiner

*Primary Examiner* — Nhan T Tran
*Assistant Examiner* — Marly Camargo
(74) *Attorney, Agent, or Firm* — Fitzpatrick, Cella, Harper & Scinto

(57) ABSTRACT

The invention enables a verifier to easily confirm that the image data was captured in the multiple exposure mode, and also to easily confirm which area in the image captured in the multiple exposure mode was greatly affected by multiple exposure. An image generating unit generates exposure image data pieces by exposing an image sensor a plurality of times. An image composition unit combines exposure image data pieces to generate a single piece of composite image data. A reference image generating unit generates reference image data composed of data pieces for distinguishing pixel positions at which the exposure amount exceeds a threshold from the other pixel positions. A verification data generating unit generates verification data for determining whether alteration has been made from the composite image data and the reference image data to output a single file.

11 Claims, 18 Drawing Sheets

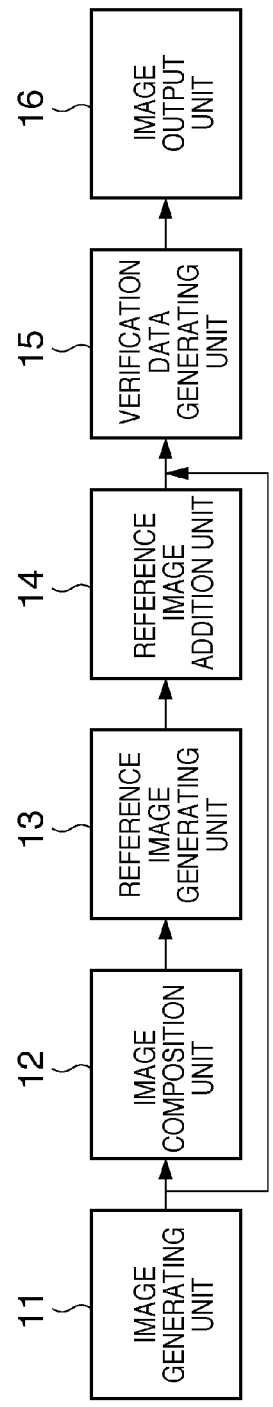
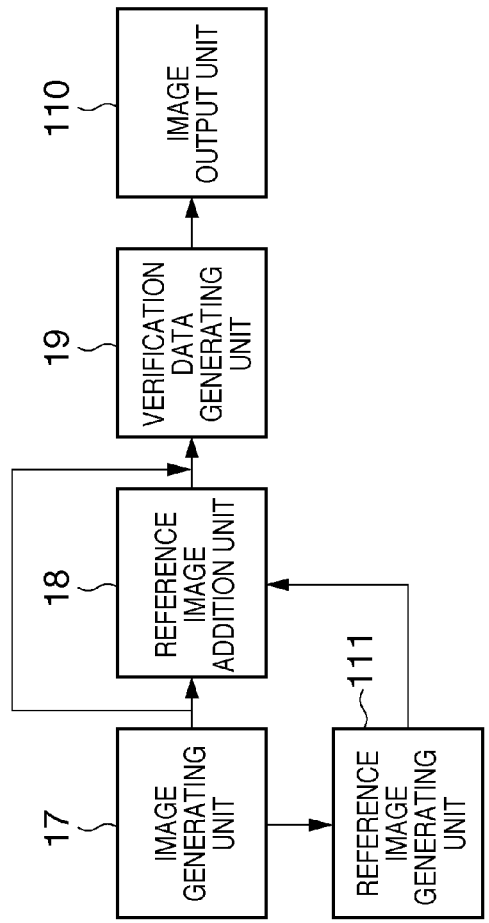
FIG. 1A
FIG. 1B

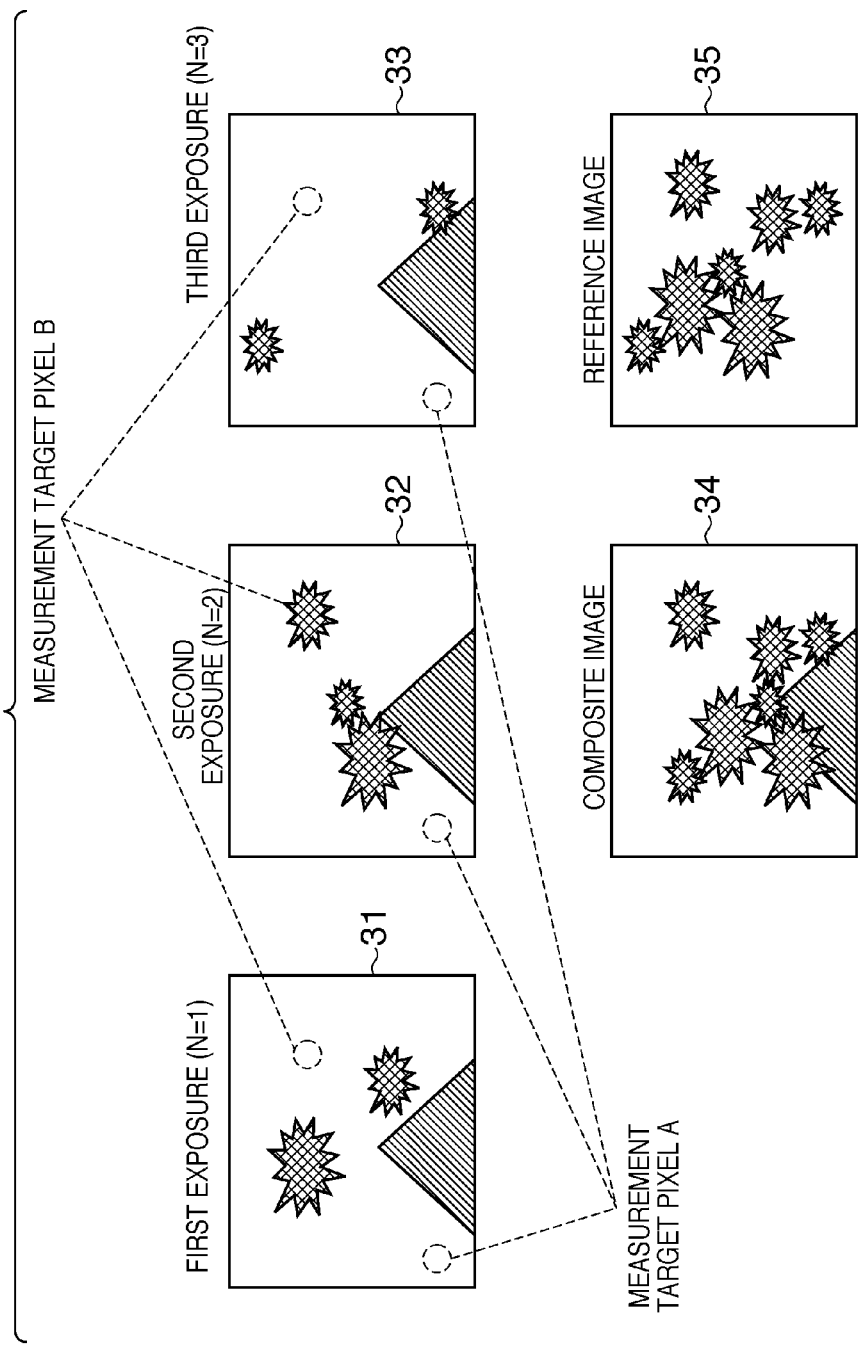

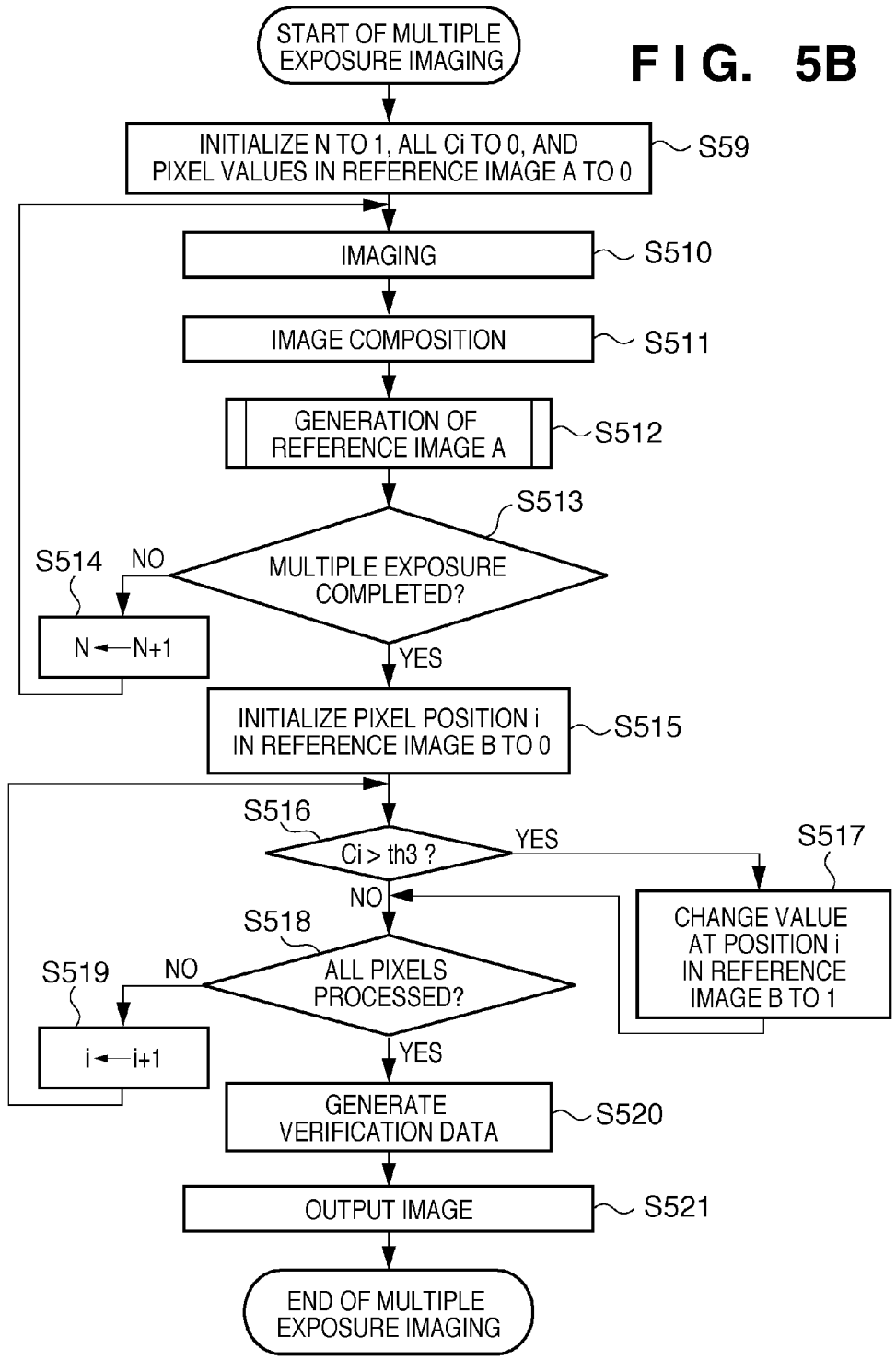
F I G. 5B

IMAGE INPUT APPARATUS, IMAGE VERIFICATION APPARATUS, AND CONTROL METHODS THEREFOR

BACKGROUND OF THE INVENTION

1. Field of the Invention

The present invention relates to authentication technology for use with an image obtained from multiple exposure.

2. Description of the Related Art

Digital image data captured with a digital camera is easy to edit using photo-retouching tools commercially available for personal computers, for example. In other words, this means that image data obtained with a digital camera is easy to alter. For this reason, images represented by digital image data are less reliable than conventional silver halide photographs and accordingly there is the problem that such digital images are less acceptable as video evidence. In order to address this problem, methods have been proposed as disclosed in U.S. Pat. No. 5,499,294 (hereinafter referred to as "Document 1"). According to Document 1, secret information unique to each digital camera is embedded in advance in the camera. When image data is obtained with the digital camera, the secret information is used to perform signature processing on the obtained image data inside the digital camera. By performing verification processing using resultant signature information after image capture, the fidelity of the captured image data to its original can be ensured.

Meanwhile, some digital cameras have a multiple exposure mode in which multiple exposure is performed on the same image data as disclosed in Japanese Patent Laid-Open No. 2006-174026 (hereinafter referred to as "Document 2"). For example, in the case of image data obtained from multiple exposure including two exposures, a piece of image data recorded with the first exposure and a piece of image data recorded with the second exposure are combined within a digital camera, and resultant composite image data is output (stored) as a final captured image from the digital camera to a nonvolatile memory. Such an image obtained in the multiple exposure mode is not a true image because that image is a composition of images captured at different times. In other words, an image obtained from multiple exposure can represent a scene that is not perceptible by humans.

If signature processing as disclosed in Document 1 is performed on image data obtained in the multiple exposure mode as disclosed in Document 2, the image data will successfully pass signature verification if it was not altered after image capture. This verification result demonstrates a new problem whereby a image data may be misconceived by the verifier as a real scene that did actually exist.

SUMMARY OF THE INVENTION

The present invention has been conceived in view of the above-described problems. The present invention provides technology that enables a verifier, in the case where an image is captured in a multiple exposure mode, to easily confirm that the image was captured in the multiple exposure mode, and also to easily confirm which area in a composite image obtained from multiple exposure was greatly affected by the multiple exposure.

In order to solve the above-described problems, an image input apparatus according to the present invention is configured, for example, as follows. Specifically, an image input apparatus for acquiring exposure image data from an imaging unit by exposing the imaging unit to an image of an object includes a multiple exposure unit that exposes the imaging unit a plurality of times and obtains a single piece of exposure image data from each exposure performed the plurality of times, a composition unit that generates a single piece of composite image data from the pieces of exposure image data obtained by the multiple exposure unit, a detection unit that detects a difference in exposure amount at one pixel position among the pieces of exposure image data obtained by the multiple exposure unit, a reference image generating unit that compares a difference in exposure amount at each pixel position detected by the detection unit with a preset threshold, and generates reference image data composed of data pieces for distinguishing pixel positions at which the difference in exposure amount exceeds the threshold from the other pixel positions, a verification data generating unit that generates verification data for determining whether or not alteration has been made to data from the composite image data obtained by the composition unit and the reference image data obtained by the reference image generating unit, and an output unit that outputs the composite image data, the reference image data, and the verification data.

The present invention provides technology that enables a verifier, in the case where an image is captured in a multiple exposure mode, to easily confirm that the image was captured in the multiple exposure mode, and also to easily confirm which area in a composite image obtained from multiple exposure was greatly affected by the multiple exposure.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 1A and 1B are functional configuration diagrams of image input processing applicable to an embodiment.

FIG. 3 is a diagram illustrating composition processing with multiple exposure and a reference image according to an embodiment.

FIGS. 5A and 5B are flowcharts of the image input processing applicable to an embodiment.

DESCRIPTION OF THE EMBODIMENTS

Following is a detailed description of embodiments according to the present invention with reference to the accompanying drawings.

Basic Configuration of Image Input Apparatus

Figure 2:
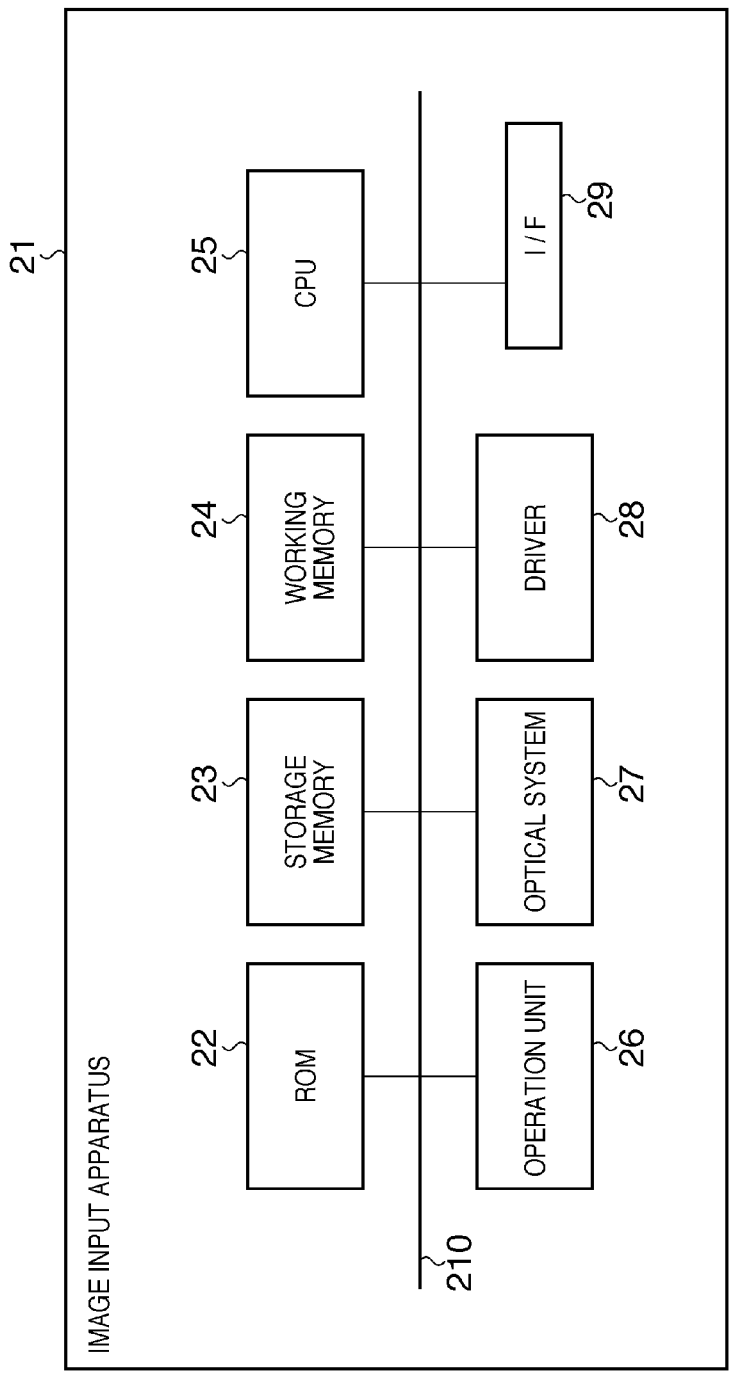
FIG. 2 is a block diagram showing the configuration of an image input apparatus applicable to an embodiment.

First of all, an image input apparatus applicable to the present embodiment is described with reference to FIG. 2. FIG. 2 is a diagram showing a basic configuration of an image input apparatus applicable to the present embodiment. As shown in FIG. 2, an image input apparatus 21 according to the present embodiment is comprised of a ROM 22, a storage memory 23, a working memory 24, a CPU 25, an operation unit 26, an optical system 27, a driver 28, and an interface (I/F) 29, all of which are connected via a bus 210.

The image input apparatus 21 is, for example, a digital camera in popular use, and is capable of accumulating digital image data of an object generated by the optical system 27 in the storage memory 23 or the like when an imaging instruction has been issued through the operation unit 26.

In FIG. 2, the ROM 22 is a read-only memory in which operating programs and shared information that is necessary to generate verification data have been pre-stored. The storage memory 23 stores processed image data. The working memory 24 is where image data is temporarily stored, and compression of image data and various types of arithmetic processing are performed here. Upon issue of an imaging instruction, the CPU 25 performs compression processing on image data and various types of arithmetic processing such as generation of verification data in accordance with computer programs pre-stored in the ROM 22. The operation unit 26 is a user interface for receiving various instructions including an imaging instruction given by a photographer and instructions to set various parameters. The optical system 27 includes an optical sensor (image sensor) such as a charge coupled device (CCD) or a complementary metal oxide semiconductor (CMOS) and, upon receipt of an imaging instruction, performs processing such as imaging of a subject, electric signal processing, and digital signal processing. The driver 28 performs mechanical operations necessary for imaging under the control of the CPU 25. The I/F 29 is an interface with external devices such as memory cards, portable terminals, and communication devices and is used to transmit image data and verification data to such external devices.

Basic Configuration of Host Computer

Figure 10:
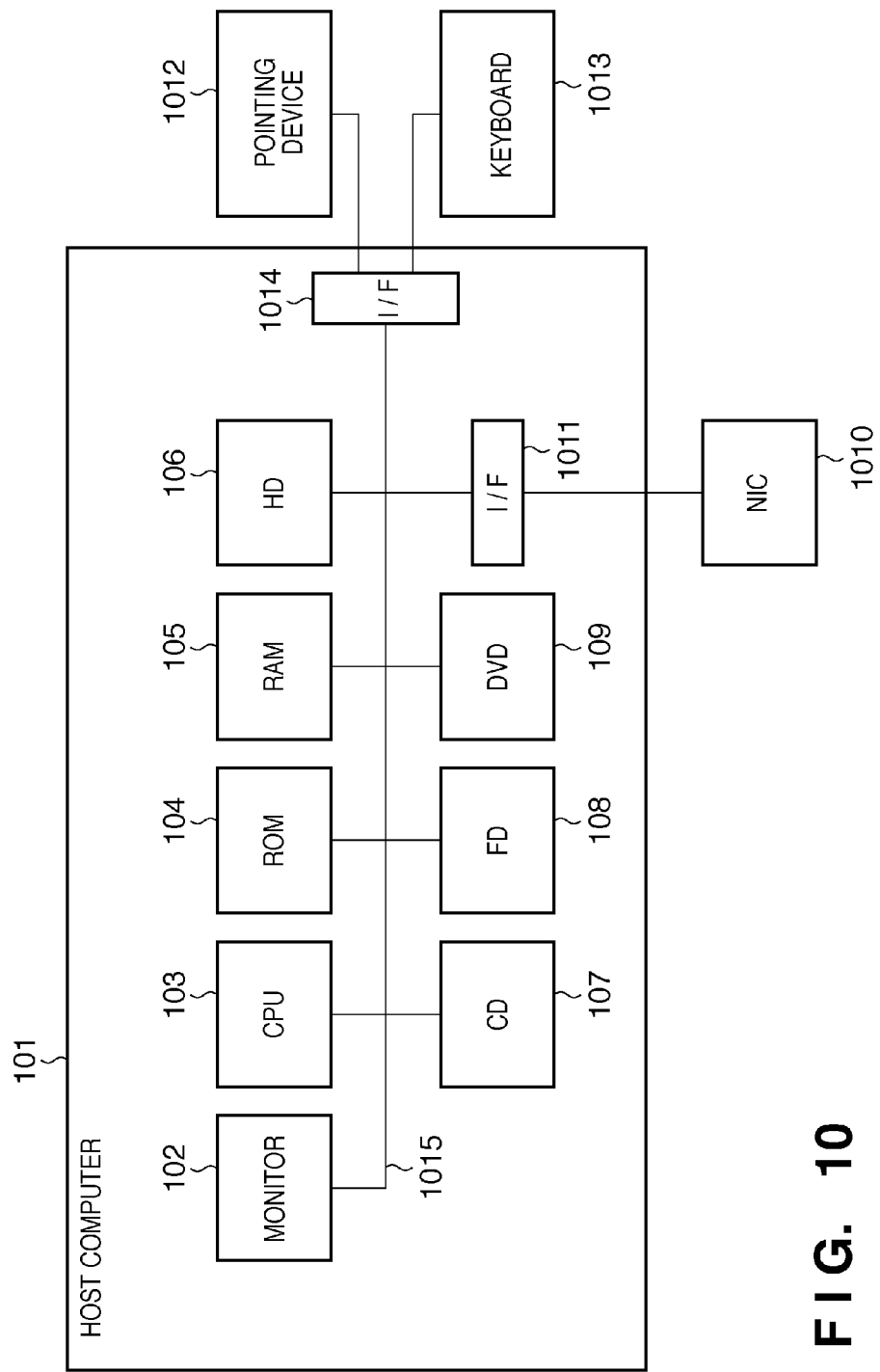
FIG. 10 is a block diagram showing the configuration of a verification apparatus applicable to an embodiment.

Next is a description of a host computer adaptable to the present embodiment with reference to FIG. 10. FIG. 10 shows the basic configuration of a host computer serving as a verification apparatus according to the present embodiment, and also shows the relation of the host computer with peripheral devices.

In FIG. 10, it is easy to understand if a host computer 101 is considered as a commonly available personal computer (PC), for example. Specifically, the host computer 101 includes a monitor 102, a CPU 103, a ROM 104, a RAM 105, an HD 106, a CD 107, an FD 108, a DVD 109, and interfaces (I/Fs) 1011 and 1014, all of which are connected to a bus 1015. Among these, the monitor 102 displays various types of information generated under the control of the CPU 103. The ROM 104 stores a BIOS and a boot program, and the RAM 105 is used as a work area for storing the OS or an application program (verification program) executed by the CPU 103. Note that the OS and application programs, for example, are stored in the HD 106. The HD 106 is a hard disk drive, the CD 107 is a compact disc drive, the FD 108 is a floppy disk drive®, and the DVD 109 is a DVD drive. Those drives are used to store image data or the like or to store computer programs. The I/F 1011 is for connecting a network interface card (NIC) 1010 connected to a network, and enables an image targeted for authentication to be downloaded from the network (including the Internet). The I/F 1014 is for connecting a pointing device 1012 such as a mouse and a keyboard 1013. The user interface is constituted by the monitor 102, the pointing device 1012, and the keyboard 1013.

Description of Image Processing by Image Input Apparatus

Below is a description of the processing content of the image input apparatus according to the present embodiment.

The following description is given of the case where the above-mentioned image input apparatus 21 has been powered on and the OS has been loaded in the working memory 24.

It should be noted that the present invention is not limited thereto, and processing may be executed by the above-mentioned host computer 101. In this case, of course, the host computer 101 will need hardware such as an imaging apparatus, but each processing unit can be substituted by a corresponding program and the CPU 103, which executes the programs. It is however noted that all functions are not necessarily realized by software, and some functions may be realized by hardware.

As shown in FIG. 1A, the image input apparatus according to the present embodiment is comprised of an image generating unit 11, an image composition unit 12, a reference image generating unit 13, a reference image addition unit 14, a verification data generating unit 15, and an image output unit 16.

In FIG. 1A, the image generating unit 11 includes, depending on the optical system 27 in FIG. 2, an optical sensor such as a CMOS (complementary metal oxide semiconductor) or a CCD (charge coupled device) and a microprocessor that controls the optical system. The image generating unit 11 acquires a video signal generated by the optical system and the optical sensor as image information and generates an image data piece I.

The image data piece I is data in which a signal value in accordance with an exposure amount received by the optical sensor is recorded for each pixel. In the case of a multiple exposure mode, the image generating unit 11 outputs a single image data piece I every time the operation unit 26 (such as a shutter button) is operated and, as a result, a plurality of image data pieces I are generated after completion of multiple exposure. After outputting the generated image data I, the image generating unit 11 initializes electric charge accumulated in the optical sensor to an initial value such as zero.

The image data pieces I output from the image generating unit 11 are temporarily stored in the working memory 24, for example. In the case of the multiple exposure mode, the image data pieces I stored in the working memory are input to the downstream image composition unit 12. On the other hand, in the case of a normal imaging mode, the image data piece I stored in the working memory is input to the downstream verification data generating unit 15. The imaging mode (the normal imaging mode or the multiple exposure mode) is selected by the user operating the operation unit 26 (such as an electronic dial or a liquid crystal panel). Details thereof will be discussed later.

The image composition unit 12 receives an input of a plurality of image data pieces I output from the image generating unit 11, combines the received image data pieces I, and outputs a single composite image Ic.

Here, an example of image composition processing applicable to the present embodiment is described with reference to FIGS. 3 and 4. FIG. 3 is a diagram showing an example in which a total number of exposures performed in the multiple exposure mode is three. Reference numerals 31, 32, and 33 denote predetermined pixel values (exposure amounts) in image data pieces I generated by the image generating unit 11 when the first exposure is performed (N=1), the second exposure is performed (N=2), and the third exposure is performed (N=3), respectively. In the example shown in FIG. 3, three exposures are performed in total. For ease of description, pixels targeted for measurement (measurement target pixels) A and B are defined in the positions shown in FIG. 3. As shown, the measurement target pixel A is a pixel at which the exposure amount is constant throughout all the time of exposures. On the other hand, the measurement target pixel B is a pixel at which the exposure amount differs between the time of the second exposure (N=2) and the time of the first and third exposures (N=1 and N=3). FIGS. 4A and 4B show the exposure amounts and resultant composite images at the measurement target pixels A and B in FIG. 3, respectively. A result of the composition of the images is indicated by reference numeral 34 in FIG. 3.

Figure 4A:
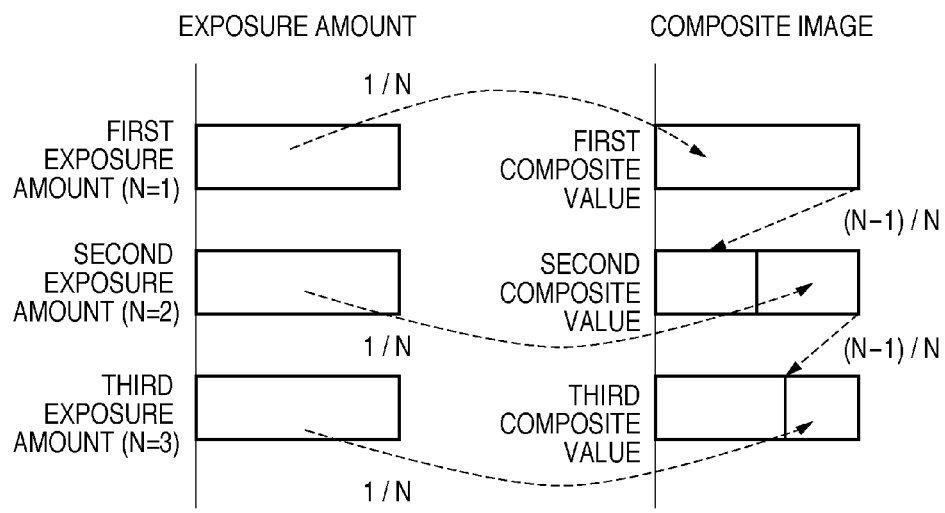
FIGS. 4A and 4B are diagrams illustrating the composition processing content with multiple exposure according to an embodiment.
Figure 4B:
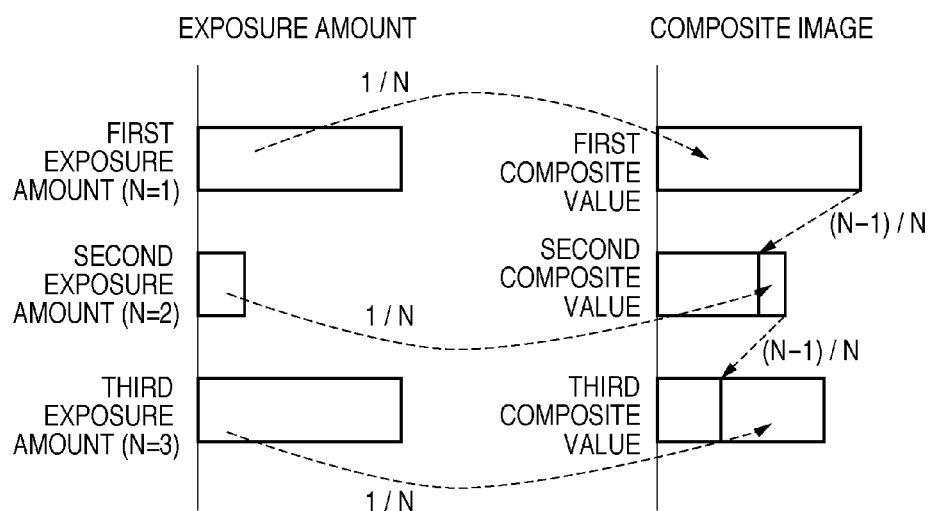

In the present embodiment, as shown in FIGS. 4A and 4B, the image composition processing is performed using two coefficients, namely, a first coefficient calculated as 1/N from the number of exposures (N) and a second coefficient calculated as (N-1)/N from the number of exposures (N). Specifically, the sum of a value obtained by integrating the Nth exposure amount and the first coefficient 1/N and a value obtained by integrating the N-1th composite value and the second coefficient (N-1)/N is calculated as the Nth composite value. In the present embodiment, a final composite image resulting from the three exposures is a composite value obtained when N=3.

In the present embodiment, although the image composition processing as described above is applied, the present invention is not limited thereto, and various types of image composition processing are clearly applicable.

The reference image generating unit 13 receives an input of a plurality of image data pieces I generated by the image generating unit 11, generates a reference image from the received image data pieces I, and outputs the generated reference image Ir. Details of the reference image generation processing according to the present embodiment will be discussed later.

The reference image addition unit 14 adds the reference image Ir generated by the reference image generating unit 13 to the composite image Ic generated by the image composition unit 12, and outputs the composite image Ic with the reference image Ir added thereto.

In the present embodiment, although such a reference image is added for example by being recorded in the header of image data formatted in Exif format for example, the present invention is not limited thereto, and a reference image may be coupled to the end of image data, for example.

Figure 11A:
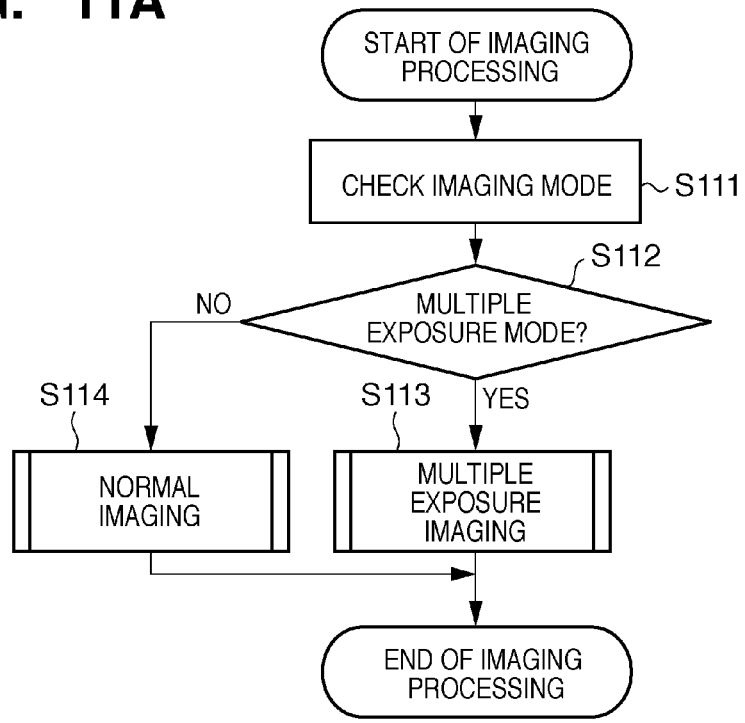
FIGS. 11A and 11B are flowcharts of imaging processing applicable to an embodiment.
Figure 12:
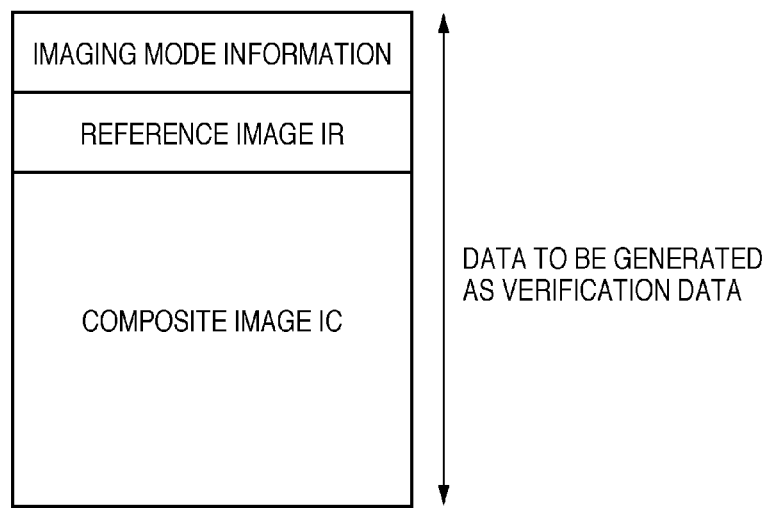
FIG. 12 is a diagram illustrating data to be generated as verification data applicable to an embodiment.

The verification data generating unit 15 receives an input of the composite image Ic with the reference image Ir added thereto, generates verification data from the received image data (the composite image Ic and the reference image Ir) and imaging mode information as shown in FIG. 12, and outputs the generated verification data. Here, the imaging mode information is information indicating the imaging mode determined in step S111 (FIG. 11A) discussed later. In the present embodiment, the value 1 is applied for the multiple exposure mode, and otherwise the value 0 is applied. Note that although the description of the present embodiment is given assuming that verification data is generated from the imaging mode information, the reference image Ir, and the composite image Ic as shown in FIG. 12, the present invention is not limited thereto, and verification data may include other data as long as the above three pieces of information are included. For example, the imaging mode information and the reference image Ir may be recorded as part of Exif information, and a verification image may be generated from the Exif information that also includes other metadata and the composite image Ic.

Applicable examples of verification data according to the present embodiment include a MAC (message authentication code) and a digital signature. Note that methods for generating a MAC and a digital signature are well-known techniques for those skilled in the art, and therefore detailed descriptions thereof have been omitted.

In the case where a MAC is applied as verification data, secret information for generating a MAC is input as a signature key KS and used to generate a MAC. The signature key KS needs to be shared between the image input apparatus and a verification apparatus discussed later. Accordingly, common secret information is pre-stored in, for example, the ROM 22 inside the image input apparatus and the HD 106 inside the verification apparatus so that the verification data generating unit 15 can use the secret information as necessary. Alternatively, the signature key KS may be stored in a tamper-resistant device such as an IC card, and the IC card may be connected to the image input apparatus and the verification apparatus so that the verification data generating unit 15 can acquire and use the signature key KS from inside the IC card. As another alternative, the image input apparatus may generate new secret information therein, and the generated secret information may be used as a signature key KS. In this case, it is sufficient to store the generated secret information in a tamper-resistant device such as an IC card or to encrypt and transmit the generated secret information to the image verification apparatus.

On the other hand, in the case where a digital signature is applied as verification data, a secret key for generating a digital signature is input as a signature key KS. For this, a signature key KS is pre-stored in the ROM 22 inside the image input apparatus so that the verification data generating unit 15 can use the signature key KS as necessary. Alternatively, a signature key KS may be stored in a tamper-resistant device such as an IC card, and the IC card may be connected to the image input apparatus 21 so that the verification data generating unit 15 can acquire and use the signature key KS from inside the IC card. As another alternative, the image input apparatus may generate a new signature key KS therein, and the generated signature key KS may be used. In either case, a public key corresponding to the signature key KS used by the verification data generating unit 15 is necessary inside the verification apparatus discussed later. For this reason, the downstream image output unit 16 adds a public key corresponding to the signature key KS to image data and transmits the image data to the image verification apparatus. Alternatively, a public key may be stored on a server (not shown), and information indicating the location on the server where the public key is stored (such as an URL) may be recorded in image data. The verification apparatus may use such information indicating the stored location to acquire the public key from the server as necessary.

The image output unit 16 adds the verification data output from the verification data generating unit 15 to the composite image Ic and the reference image Ir output from the upstream image composition unit 12, and outputs the data as a single file.

In the present embodiment, the verification data is added by being recorded in the header of image data I formatted in Exif format, for example. However, the present invention is not limited thereto, and the verification data may be coupled to the end of the composite image data Ic.

The image output unit 16 records image data as a single image data file on a storage medium such as a removable medium, or transmits image data to a predetermined host computer via a wired or wireless network. The above has been a description of the configuration of the image input apparatus according to the present embodiment.

Procedure of Imaging Processing

Following is a description of the procedure of imaging processing performed by the image input apparatus 21 according to the present embodiment with reference to FIG. 11A. FIG. 11A is a flowchart showing the procedure of imaging processing applicable to the present embodiment.

First, the CPU 25 checks which imaging mode is currently selected, using the operation unit 26 (such as an electronic dial or a liquid crystal panel) (S111). Then, the CPU 25 determines whether or not the imaging mode is the multiple exposure mode (S112). In the case of the multiple exposure mode, the procedure proceeds to multiple exposure imaging (S113), and otherwise proceeds to normal imaging (S114). After execution of each processing, the imaging processing ends.

Figure 11B:
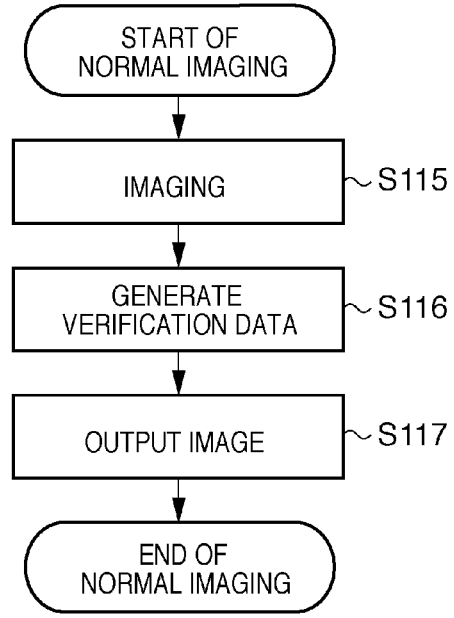

Next, the normal imaging processing in step S114 is described in detail with reference to FIG. 11B. First, the image generating unit 11 generates image data upon operation of the operation unit 26 by the user of the image input apparatus 21 (S115). Then, the verification data generating unit 15 generates verification data from the image data generated by the image data generating unit 11 (S116), and the image output unit 16 outputs the resultant image data (S117).

Next, the multiple exposure imaging processing in step S113 is described in detail with reference to FIG. 5A. First, a variable N indicating the number of times an exposure has been performed is initialized to 1 and all pixel values in a reference image is initialized to 0 (S51), and the image generating unit 11 generates a single image data piece every time the user of the image input apparatus 21 operates the operation unit 26 (such as a shutter button) (S52). Then, the image composition unit 12 performs image composition processing using the Nth image data generated by the image generating unit 11 and a composite image obtained up to the N-1th exposure (S53). Subsequently, the reference image generating unit 13 generates a reference image from the Nth image data generated by the image generating unit 11 and the N-1th image data (S54). Details of the reference image generation processing in step S54 will be discussed later. Thereafter, it is determined whether or not multiple exposure has been completed (S55), and if multiple exposure has been completed, the procedure proceeds to step S57, and otherwise proceeds to step S56. In step S56, the variable N indicating the number of times exposure has been performed is incremented by one and thereafter the procedure proceeds to step S52. In step S57, on the other hand, the verification data generating unit 15 generates verification data from the image data generated by the reference image addition unit 14 (S57), and the image output unit 16 outputs the resultant image data (S58).

Figure 6A:
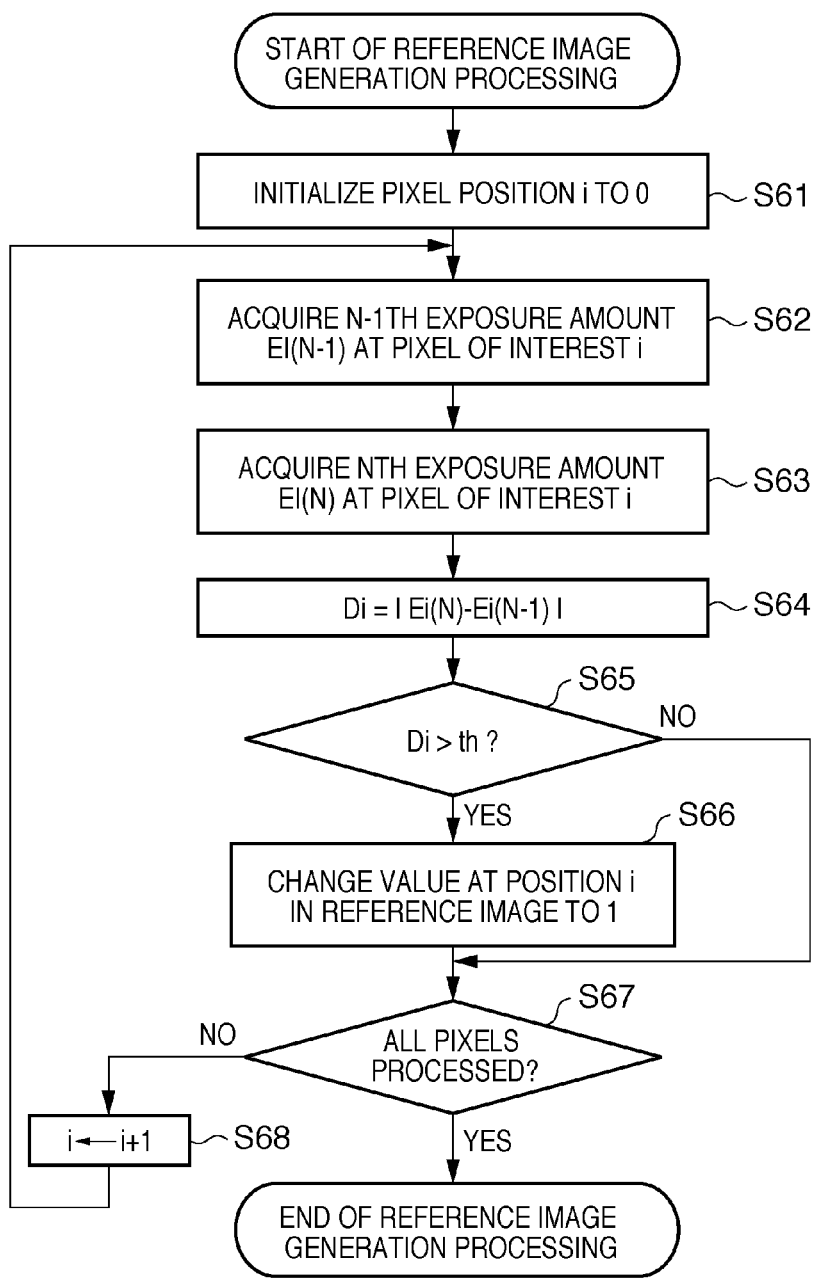
FIGS. 6A and 6B are flowcharts of reference image generation processing applicable to an embodiment.

Now, a detailed procedure of the reference image generation processing in step S54 will be described with reference to FIG. 6A. FIG. 6A is a flowchart showing the procedure of reference image generation processing applicable to the present embodiment. Note that in the description below, a variable i indicates a pixel position in image data during raster scanning.

First, the pixel position i is initialized to 0 so as to represent the first pixel in image data (S61). Then, the N-1th exposure amount Ei(N-1) (S62) and the Nth exposure amount Ei(N) (S63) at the pixel of interest i are acquired from image data. The N-1th image data may be stored in the working memory 24 serving as a buffer, for example. Also, in the case where N=1, the N-1th exposure amount may be the same value as when N=1. Then, an absolute value of the difference between the calculated N-1th and Nth exposure amounts Ei(N-1) and Ei(N) is calculated as the amount of change in exposure amount (exposure change amount) Di from Equation (1) as follows:

$$Di=|Ei(N)-Ei(N-1)| \quad (1)$$

where |x| is the absolute value of x (S64).

Then, it is determined whether or not the calculated Di is greater than a predetermined threshold th (S65). For the threshold th, a predetermined value may be recorded in advance in the ROM 22, for example. Alternatively, the operator of the image input apparatus 21 may input a desired value through the operation unit 26, for example, and the input value may be recorded in the ROM 22, for example. If Di is greater than the threshold th, the procedure proceeds to step S66, and otherwise proceeds to step S67. In step S66, the pixel value corresponding to the pixel position i in the reference image is set to 1. Then, it is determined whether or not all the pixels have been processed (S67), and if an unprocessed pixel exists, the procedure proceeds to step S68. In step S68, the variable i indicating the pixel position is incremented by one and thereafter the procedure proceeds to step S62. On the other hand, if it has been determined that all the pixels have been processed, the reference image generation processing ends.

The above has been a description of the procedures of the imaging processing and the reference image generation processing according to the present embodiment.

Note that in the present embodiment, although the reference image is generated using Equation (1), the present invention is not limited thereto, and various methods are applicable. For example, instead of using Equation (1), Di may be calculated as follows.

$$Di=|Ei(N)-AVE(Ei(N-1))| \quad (2)$$

In Equation (2), AVE(Ei(N-1)) is an average of exposure amounts at the pixel position i from Ei(1) up to Ei(N-1). The average AVE(Ei(N-1)) may be calculated every time the image generating unit 11 has generated image data, and the calculated value may be stored in the RAM 105, for example.

As another alternative, instead of using Equation (1), Di may be calculated as follows.

$$Di=Ei(N)/Ei(N-1) \quad (3)$$

According to Equation 3, in the case where the exposure amount is constant throughout the times of the Nth and N-1th exposures, the value of Di approximates 1. On the other hand, in the case where the exposure amount differs between the time of the Nth exposure and the time of the N-1th exposure, the value of Di is not close to 1. Accordingly, in the case of applying Equation (3) in step S64, the determination in step S65 may be made using Inequality (4) below.

$$|Di-1|>th \quad (4)$$

Specifically, if Inequality (4) is satisfied, the procedure proceeds to step S66, and otherwise proceeds to step S67. In any case, various methods are applicable as long as it is possible to detect a pixel at which the exposure amount varies from time to time among a plurality of image data pieces generated by the image generating unit 11.

Now, a description will be given of an example of generating a reference image according to the above-described procedure with reference to FIG. 3. In FIG. 3, the measurement target pixel A is a pixel at which the exposure amount is constant throughout three exposures. In this case, Di calculated from Equation (1) above approximates 0 at each time. On the other hand, Di for the measurement target pixel B is a large value because the exposure amounts during the first and third exposures (N=1 and N=3) are greater than that during the second exposure (N=2). Accordingly, as a result of the comparison between Di and th, a pixel value corresponding to the measurement target pixel A in the reference image is set to 0, whereas the pixel value corresponding to the measurement target pixel B is set to 1. In FIG. 3, reference numeral 35 denotes an example reference image that is visualized and displayed using black for a portion with pixel value "1", which indicates a pixel position at which the exposure change amount is large during exposure performed in the multiple exposure mode, and using white for the other portions with pixel value "0".

As described above, it is possible according to the present invention to, in the case where a single piece of image data is generated from a plurality of exposures, record a reference image that represents a pixel position at which the exposure amount differs greatly among different exposures and to output the reference image along with image data.

Configuration of Verification Processing Unit

Figure 7:
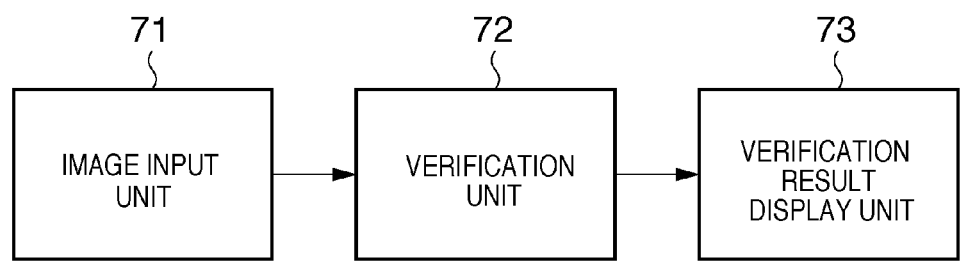
FIG. 7 is a functional configuration diagram of an image verification apparatus applicable to an embodiment.

Following is a description of a verification apparatus applied to the present embodiment with reference to FIG. 7. Note that the following description is given of the case where the above-mentioned host computer 101 has been powered on and the OS has been loaded in the RAM 105.

As shown in FIG. 7, the verification apparatus according to the present embodiment is comprised of an image input unit 71, a verification unit 72, and a verification result display unit 73. Note that verification processing described hereinafter may be realized by software processing. In that case, the above units shall be considered as conceptual illustrations of the functions necessary for the verification processing.

In FIG. 7, the image input unit 71 receives an input of image data targeted for verification that is output from the above-described image input apparatus. The type of the input source of image data is not particularly limited, and the image input unit 71 may download image data via a network or may input image data via a removable medium or the like. Also, the image input unit 71 analyzes the header of the received image data and extracts and outputs image data as well as attached verification data and reference image data.

The verification unit 72 receives an input of image data, reference image data, and verification data output from the upstream image input unit 71 and a verification key KS, verifies whether or not the image data has been altered using the received data, and outputs a verification result ("OK", indicating success or "NG", indicating failure).

Verification processing performed by the verification unit 72 has to correspond to data generated by the aforementioned verification data generating unit 15. Specifically, in the case where a MAC has been generated by the verification data generating unit 15, the verification unit 72 performs verification processing using the MAC. On the other hand, in the case where a digital signature has been generated by the verification data generating unit 15, the verification unit 72 performs verification processing using the digital signature. It shall also be considered that the verification key KS in the case of using a MAC is the same secret information as used for the signature key KS applied in the verification data generating unit 15, and the verification key KS in the case of using a digital signature is a public key corresponding to the signature key KS applied in the verification data generating unit 15. Note that verification methods using a MAC and a digital signature are well-known techniques for those skilled in the art, and therefore detailed descriptions thereof have been omitted.

The verification result display unit 73 displays the verification result obtained by the upstream verification unit 72 with the monitor 102, for example. The verification result display unit 73 further outputs the reference image output from the image input unit 71 as necessary along with the verification result. Details of the verification result display unit 73 will be discussed later. The above has been a description of the configuration of the verification apparatus according to the present embodiment.

Procedure of Verification Processing

Figure 8:
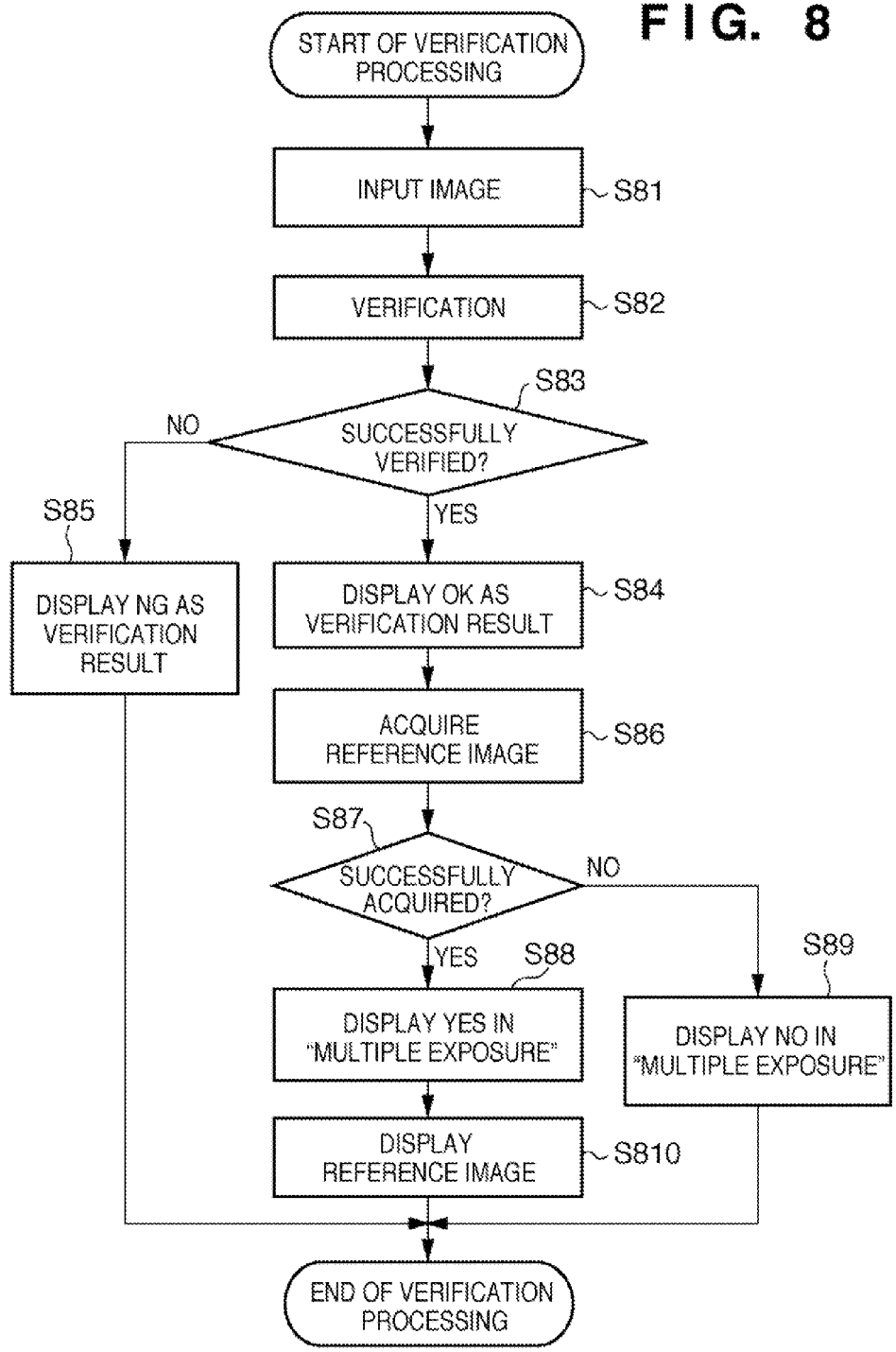
FIG. 8 is a flowchart of verification processing applicable to an embodiment.

Below is a description of the procedure of verification processing performed by the verification apparatus according to the present embodiment with reference to FIG. 8. FIG. 8 is a flowchart showing the procedure of verification processing applicable to the present embodiment.

First, the image input unit 71 receives an input of image data targeted for verification processing (S81). Then, the verification unit 72 verifies whether or not received image data has been altered (S82). Then, it is determined in step S83 whether or not the image data has been successfully verified (first determination), and if the image data has been successfully verified, the procedure proceeds to step S84, and otherwise proceeds to step S85. In step S85, the verification result display unit 73 displays "NG" (image data has been altered or verification was not possible) as the verification result and thereafter the verification processing ends. On the other hand, in step S84, the verification result display unit 73 displays "OK" (image data has not been altered) as the verification result and thereafter in step S86, it is determined whether or not the image data received by the image input unit 71 includes a reference image, or an attempt is made to acquire a reference image (S86). Then, it is determined in step S87 whether or not a reference image has been successfully acquired (second determination). If a reference image has been acquired, the procedure proceeds to step S88, and otherwise proceeds to step S89. In step S88, the verification result display unit 73 displays "YES" in the "multiple exposure" field and thereafter the procedure proceeds to step S810. In step S810, the reference image acquired in step S86 is converted into visible data and displayed through the verification result display unit 73. On the other hand, in step S89, the verification result display unit 73 displays "NO" in the "multiple exposure" field and thereafter the verification processing ends. Determining whether or not a reference image exists as described above is equivalent to determining whether or not image data has been obtained from multiple exposure. In the case where a plurality of image data pieces are input in step S81, the processing of steps S82 to S810 is performed repeatedly for each image data piece.

Figure 9:
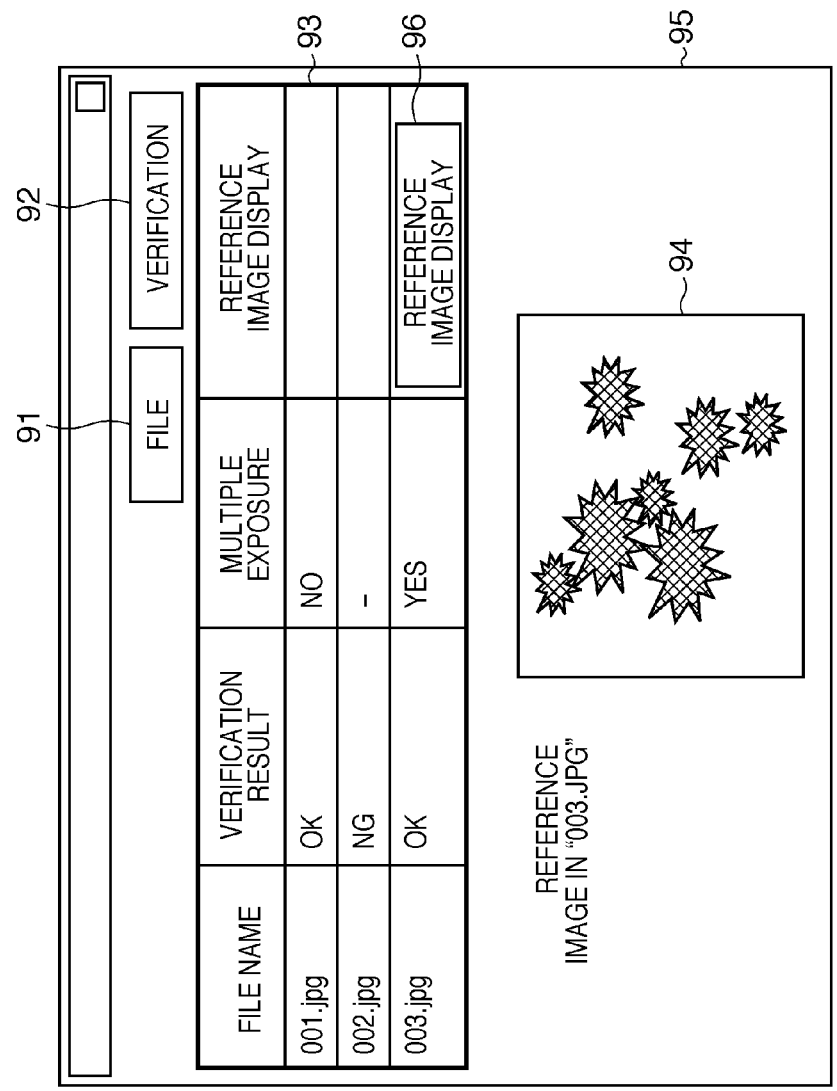
FIG. 9 is a diagram illustrating an example of the display of an image verification result applicable to an embodiment.

Here, an example of the verification result display unit 73 according to the present embodiment is described with reference to FIG. 9. FIG. 9 shows a window displayed at the time of execution of an image verification application program operating on the verification apparatus. This application program is stored in an external storage device such as a hard disc device and is loaded and executed in the RAM by the CPU at the time of execution.

A window 95 shown in FIG. 9 includes buttons 91 and 92 at the top for specifying various commands given to the verification apparatus. By clicking the button 91 or 92 with a pointing device such as a mouse, a command corresponding to file selection or verification processing, respectively, is issued to the verification apparatus. Reference numeral 93 denotes an area for displaying the verification result, in which "filename", "verification result", "multiple exposure", and "reference image display" fields are displayed in order from the left. Here, the "filename" field includes filenames that specify image data input to the aforementioned image input unit 71. The "verification result" field includes verification results (results displayed in step S84 or S85) output from the verification unit 72. The "multiple exposure" field includes information output from the verification unit 72 and indicating whether or not image data has been obtained from multiple exposure (results displayed in step S88 or S89). The "reference image display" field displays or enables pressing (clicking) of a reference image display button 96 in the case of image data obtained from multiple exposure. With a press of the reference image display button 96, the reference image acquired in step S86 is displayed in a reference image display portion 94. Here, composite image data obtained from multiple exposure is first displayed, and thereafter pixels with value "1" in the reference image are displayed with their color replaced by a preset color. As a result, portions greatly affected by multiple exposure are replaced as previously intended, so it is possible for the observer to ascertain which portions have been greatly affected.

Note that the window shown in FIG. 9 is merely one example applicable to the present invention, and the present invention is clearly not limited thereto. For ease of visual identification, a slider bar may be provided in the window in FIG. 9 and the position of the slider bar may be changed with the pointing device so as to increase or decrease the luminance of only pixels greatly affected by multiple exposure (pixels with value "1" in the reference image) during display. Also, depending on the case, multiple exposure image data and reference image data may be displayed side by side or may be alternately displayed in the same region. Moreover, it is also possible to convert a composite image obtained from multiple exposure into a grayscale monochrome image and then to display only pixel positions with value "1" in the reference image in a chromatic color, because it is sufficient to distinguish portions greatly affected by multiple exposure from the other portions.

According to the present embodiment as described above, in the case of an image captured in the multiple exposure mode, the image input apparatus generates reference image data therein and outputs the reference image data along with image data. The reference image data is then displayed along with alteration verification results at the time of verification. This prevents verifiers from misconceiving a scene that did not actually exist, such as a scene of image data captured in the multiple exposure mode, as a real scene that actually existed.

Description of Modification 1

In the above embodiment, an example has been described in which, if the difference $D_i$ between the Nth exposure amount $E_i(N)$ and the N-1th exposure amount $E_i(N-1)$ is greater than the threshold, corresponding reference pixels are determined as pixels greatly affected by multiple exposure. However, in the multiple exposure mode, there still remains a possibility that a pixel position such as in which the exposure amount gradually changes from the first exposure to the last exposure may also be a portion greatly affected by multiple exposure, although its difference in exposure amount between each two consecutive exposures is less than or equal to the threshold. The following description is thus given of an example in which another reference image is further generated so as to indicate a portion that is difficult to determine whether or not it has been greatly affected by multiple exposure. The reference image of the previously described embodiment is referred to as a reference image A (or first reference image data) and a reference image unique to the present modification is referred to as a reference image B (or second reference image data).

First is a description of the procedure of imaging processing according to the present modification with reference to the flowchart of FIG. 5B.

First, a variable N indicating the number of times exposure has been performed is initialized to 1, all the numbers of times the exposure amount has changed, $C_i$, are initialized to 0, and all the pixel values in the reference image A are initialized to 0 (S59). Here, the subscript i in $C_i$ is equivalent to a pixel position i discussed later in step S512. Specifically, the number of times the exposure amount has changed, $C_i$, is a variable indicating the number of times the exposure amount at the pixel position i has satisfied a predetermined condition discussed later. Next, the image generating unit 11 generates a single image data piece (S510). Then, the image composition unit 12 performs image composition processing using the Nth image data generated by the image generating unit 11 and a composite image obtained up to the N-1th exposure (S511). Subsequently, the reference image generating unit 13 generates a first reference image (reference image A) from the Nth image data generated by the image generating unit 11 and the N-1th image data acceding to the same principles as in the previously described embodiment (S512). Details of processing for generating the reference image A in step S512 will be discussed later. Thereafter, it is determined whether or not a total number of exposures, that is, multiple exposure has been completed (S513) and, if multiple exposure has been completed, the procedure proceeds to step S515, and otherwise proceeds to step S514. In step S514, the variable N indicating the number of times an exposure has been performed is incremented by one and thereafter the procedure proceeds to step S510.

In step S515, a region for storing a reference image B is allocated in the working memory 24, and a variable i indicating the pixel position in the reference image B is initialized to 0. Then, it is determined whether or not the number of times the exposure amount has changed, $C_i$, at the pixel position i in the reference image B is greater than a third threshold th3 ($\geqq 0$) (S516). If $C_i$ is greater than the threshold th3, the procedure proceeds to step S517, and otherwise proceeds to step S518. In step S517, the pixel value corresponding to the pixel position i in the reference image B is set to 1. Thereafter, the procedure proceeds to step S518, in which it is determined whether or not all the pixels have been processed. If an unprocessed pixel exists in step S518, the procedure proceeds to step S519. In step S519, the variable i indicating the pixel position is incremented by one and thereafter the procedure returns to step S516. The above processing from steps S515 to S519 corresponds to second reference image generation processing.

On the other hand, if it has been determined in step S518 that all the pixels have been processed, it means that the reference image B has been completed. Accordingly, the reference image addition unit 14 adds the reference images A and B, which have been generated as described above, to the composite image data. Then, the verification data generating unit 15 generates verification data from the composite image data and the reference images A and B (S520), and the image output unit 16 outputs the resultant image data (S521).

Figure 5A:
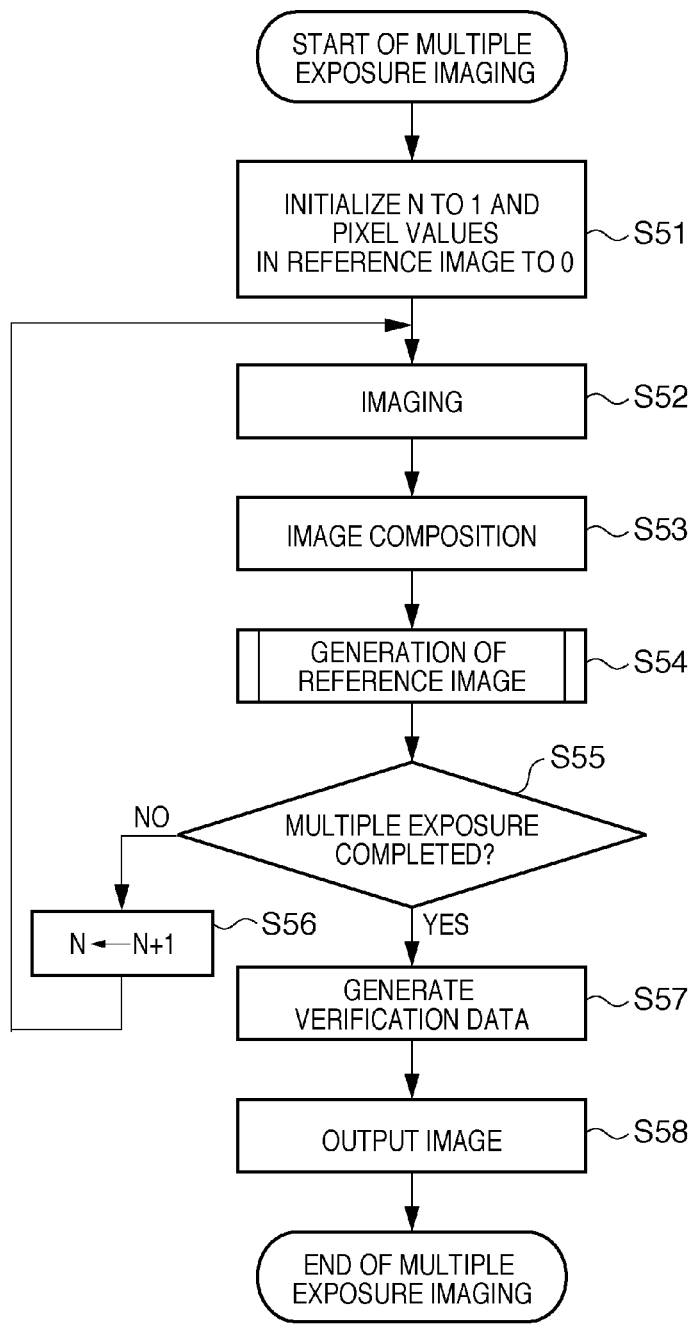
Figure 6B:
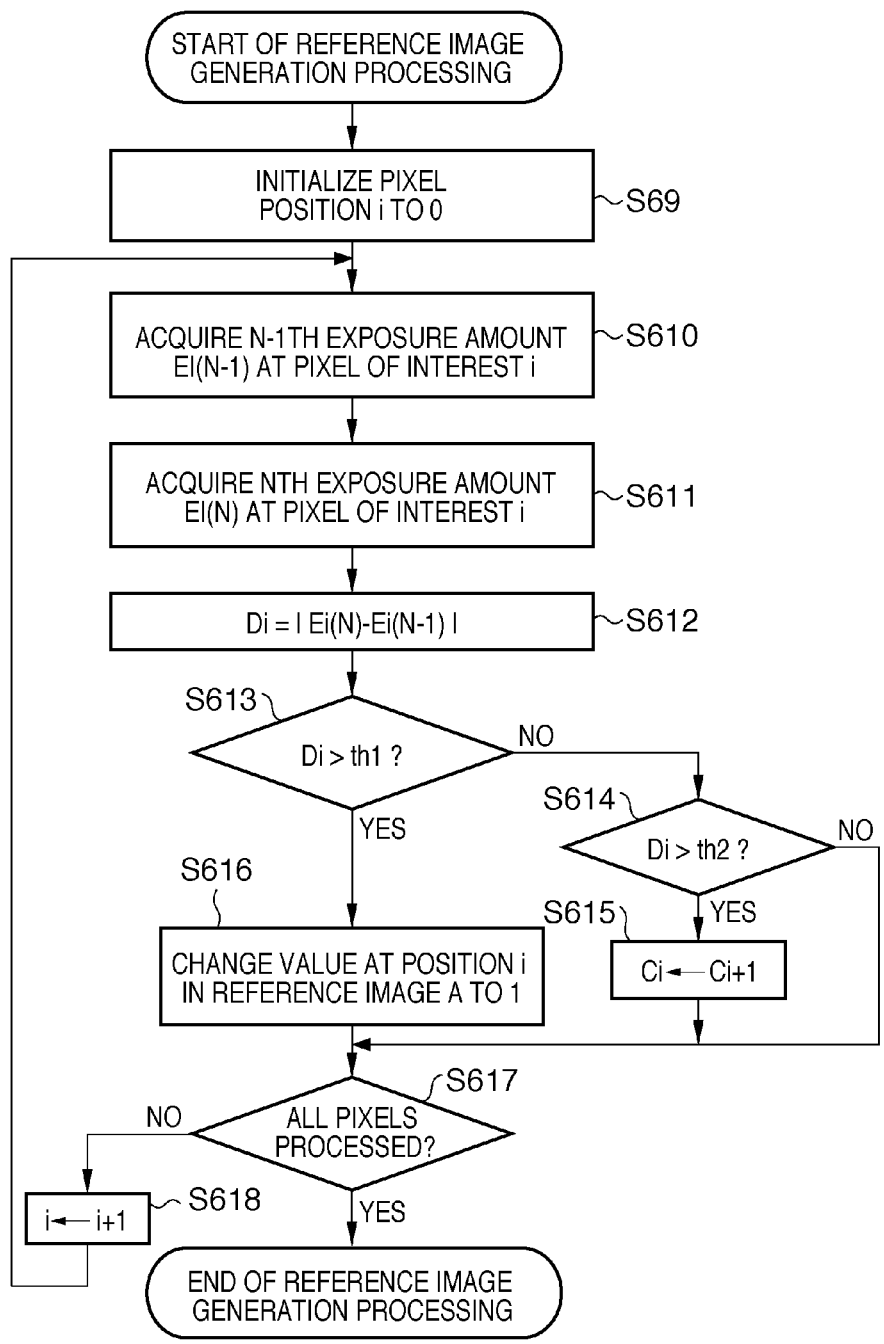

Next is a description of the reference image generation processing (first reference image generation processing) performed in step S512 in FIG. 5B with reference to the flowchart of FIG. 6B.

First, a predetermined pixel position i in image data is initialized (S69). Then, the N-1th exposure amount Ei(N-1) (S610) and the Nth exposure amount Ei(N) (S611) at the pixel of interest i are acquired from image data. The N-1th image data may be stored in the working memory 24 serving as a buffer, for example. Also, in the case where N=1, the N-1th exposure amount may be the same value as when N=1. Subsequently, an absolute value Di of the difference between the calculated N-1th and Nth exposure amounts Ei(N-1) and Ei(N) is calculated using Equation 1 above (S612).

Then, it is determined whether or not the calculated Di is greater than a predetermined first threshold th1 (S613). If Di is greater than th1, the procedure proceeds to step S616, and otherwise proceeds to step S614. In step S616, the pixel value corresponding to the pixel position i in the reference image A is set to 1. Then, it is determined whether or not all the pixels have been processed (S617), and if an unprocessed pixel exists, the procedure proceeds to step S618. In step S618, the variable i indicating the pixel position is incremented by one and thereafter the procedure proceeds to step S610.

On the other hand, if it has been determined in step S613 that Di≦th1, the procedure proceeds to step S614. In step S614, it is determined whether or not the calculated Di is greater than a predetermined second threshold th2. Here, the second threshold th2 is a value less than or equal to the first threshold th1. If Di is greater than th2, the number of times the exposure amount has changed, Ci, is incremented by one (S615) in order to count the number of times that Di at the pixel position i has been greater than the threshold t2 while remaining less than or equal to the threshold th1, and thereafter the procedure proceeds to step S617. Then, if it has been determined in step S617 that all the pixels have been processed, the reference image generation processing ends.

Note that for the first, second, and third thresholds th1, th2, and th3, predetermined values may be pre-recorded in the ROM 22, for example. Alternatively, the operator of the image input apparatus 21 may input desired values through the operation unit 26 and the input values may be recorded in the ROM 22, for example.

The above has been a description of the procedures of the imaging processing and the reference image generation processing according to the present modification. In the series of the procedures shown in FIGS. 5B and 6B, Ci is initialized to 0 in step S59 and, when th2<Di≦th1, incremented by one in step S615, and thereafter the pixel value corresponding to the pixel position i in the reference image B is set to 1 in step S517.

Through such procedures, in the case where Di>th2 and Di≦th1, the pixel value corresponding to the pixel position i in the reference image B is set to 1 when Ci>th3 and is set to 0 when Ci≦th3. In other words, it is possible in determining the influence of multiple exposure to obtain the reference image B indicating a portion that is difficult to determine whether or not it has been greatly affected by multiple exposure.

According to the present modification, in the case where a difference between the N-1th and Nth exposure amounts, while small, occurs repeatedly at a certain pixel position during multiple exposure imaging, it is possible to obtain, from the reference image, information in which such a pixel position is regarded as a region where the influence of multiple exposure imaging is unclear.

Note that one bit is enough to be assigned for a single pixel in both of the reference images A and B. Accordingly, instead of generating the reference images A and B separately, two bits may be assigned for a single pixel (bit 0 may be assigned for the reference image A and bit 1 may be assigned for the reference image B).

Also, since there are four possible combinations of the values of the reference images A and B at one pixel position, namely, (0,0), (1,0), (0,1), and (1,1), the display according to the present modification is sufficient if those four combinations are distinguishable. As one example, a different color may be used depending on the combination. As another alternative, the composite image and the reference images A and B may be displayed side by side.

Description of Modification 2

In the above-described embodiments, in the case of the multiple exposure mode, the image generating unit 11 generates a single piece of image data I every time the operation unit 26 (such as a shutter button) is operated, and outputs the generated image data I to the working memory 24, for example. Also, after the output of the generated image data I, electric charge accumulated in the optical sensor is initialized to zero, and the image composition unit 12 generates composite image data from the N-1th image data and the Nth image data.

However, the present invention is not limited thereto, and in the case of the multiple exposure mode, image data I may not have to be output every time the operation unit 26 (such as a shutter button) is operated. This case is the same as the above-described cases in that the image generating unit 11 exposes the optical sensor every time the operation unit 26 is operated, but differs in that the image generating unit 11 does not output image data for each exposure to the working memory 24, for example.

It is also to be noted that electric charge accumulated in the optical sensor for each pixel is retained as is and not initialized to an initial value such as zero, because the image generating unit 11 does not output image data. In other words, the image generating unit 11 additionally accumulates electric charge corresponding to the exposure amount in the image sensor every time the operation unit 26 is operated (a shutter button is pressed, for example). Then, after the shutter button has been pressed a specified number of times, e.g., N times, electric charge corresponding to the exposure amount for N exposures is output as image data I from the image generating unit 11 and stored in the working memory 24. Note that in this case, the image composition unit 12 is unnecessary and subsequent processing is performed using the image data I stored in the working memory 24.

A description is given of the configuration of an image input apparatus according to this modification with reference to FIG. 1B. A reference image addition unit 18, a verification data generating unit 19, and an image output unit 110 in FIG. 1B perform similar processing to the reference image addition unit 14, the verification data generating unit 15, and the image output unit 16 in FIG. 1A, respectively, and therefore descriptions thereof have been omitted.

First, the image generating unit 17 includes, depending on the optical system 27 in FIG. 2, an optical sensor such as a CMOS (complementary metal oxide semiconductor) or a CCD (charge coupled device) and a microprocessor that controls the optical system. The image generating unit 17 acquires a video signal generated by exposing the optical sensor to light as image information and generates image data I.

As previously described, the image generating unit 11 outputs a single image data piece every time the operation unit 26 is operated, and after outputting the image data piece, initializes electric charge accumulated in the optical sensor to an initial value such as zero. In contrast, the image generating unit 17 does not output image data until the number of times an exposure has been performed (N) reaches a predetermined value, then continues to accumulate electric charge generated by exposure at each pixel constituting the optical sensor, and outputs the accumulated electric charge as image data after the number of times an image has been captured has reached a predetermined value.

Specifically, image data output from the image generating unit 17 is already composite image data corresponding to the exposure amount for N exposures. It is thus noted that the processing unit corresponding to the image composition unit 12 in FIG. 1A is unnecessary in FIG. 1B. The output image data is input to the downstream reference image addition unit 18.

In the case where the difference between the Nth and N-1th exposure amounts at a pixel is greater than a predetermined threshold th, the image generating unit 17 also outputs a signal indicating that fact. This is equivalent to optically performing the processing corresponding to Equation 1 above inside the image generating unit 17. The signal output from the image generating unit 17 is input to a downstream reference image generating unit 111. Alternatively, if the difference between the Nth and N-1th exposure amounts is greater than a predetermined threshold th1, a signal with value 1 may be output, whereas if that difference is less than or equal to the predetermined threshold th1 and is greater than the threshold th2, a signal with value 2 may be output.

The reference image generating unit 111 generates a reference image using the signal output from the upstream image generating unit 17 and outputs the generated reference image. Details of reference image generation processing according to this modification will be discussed later. The reference image generated by the reference image generating unit 111 is input to the downstream reference image addition unit 18.

The above has been a description of the configuration of the image input apparatus according to the present modification.

Following is a description of the procedure of imaging processing performed by the image input apparatus 21 according to the present modification. The imaging processing performed in the present modification is basically identical to the processing described above with reference to FIG. 11A. The present modification differs from FIG. 11A in the multiple exposure imaging processing (S113), so a description is given of this processing with reference to FIGS. 13A and 13B.

Figure 13A:
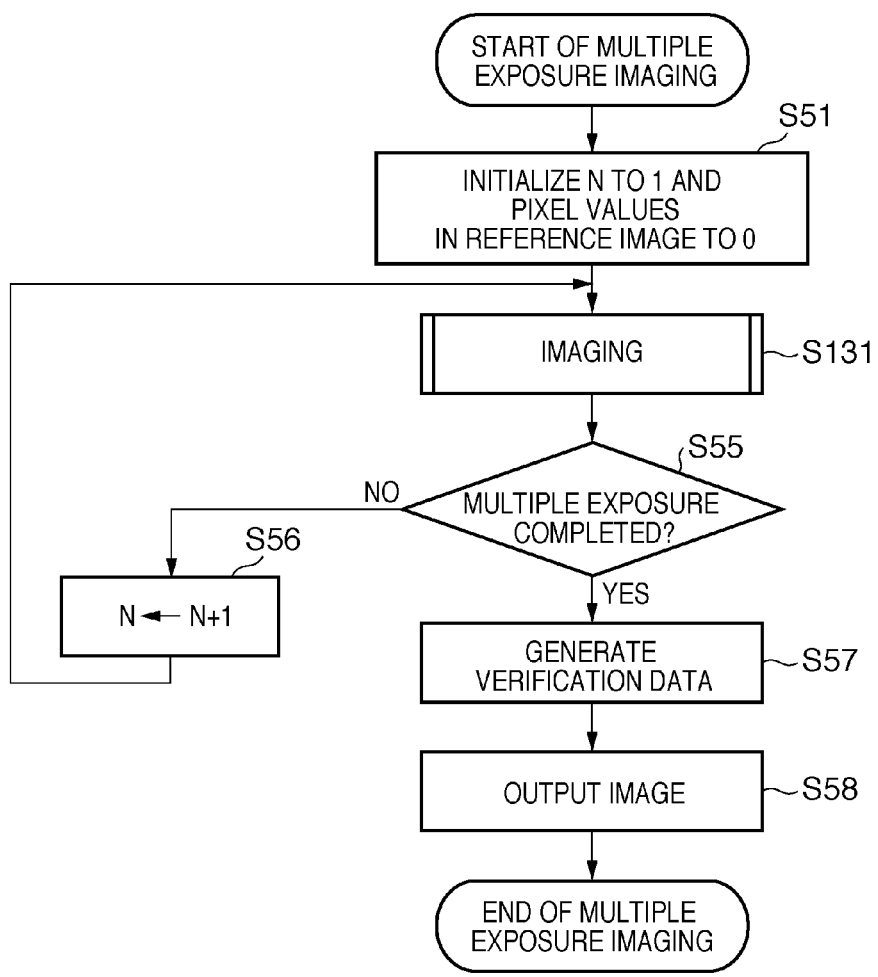
FIGS. 13A and 13B are flowcharts of multiple exposure imaging processing applicable to an embodiment.
Figure 13B:
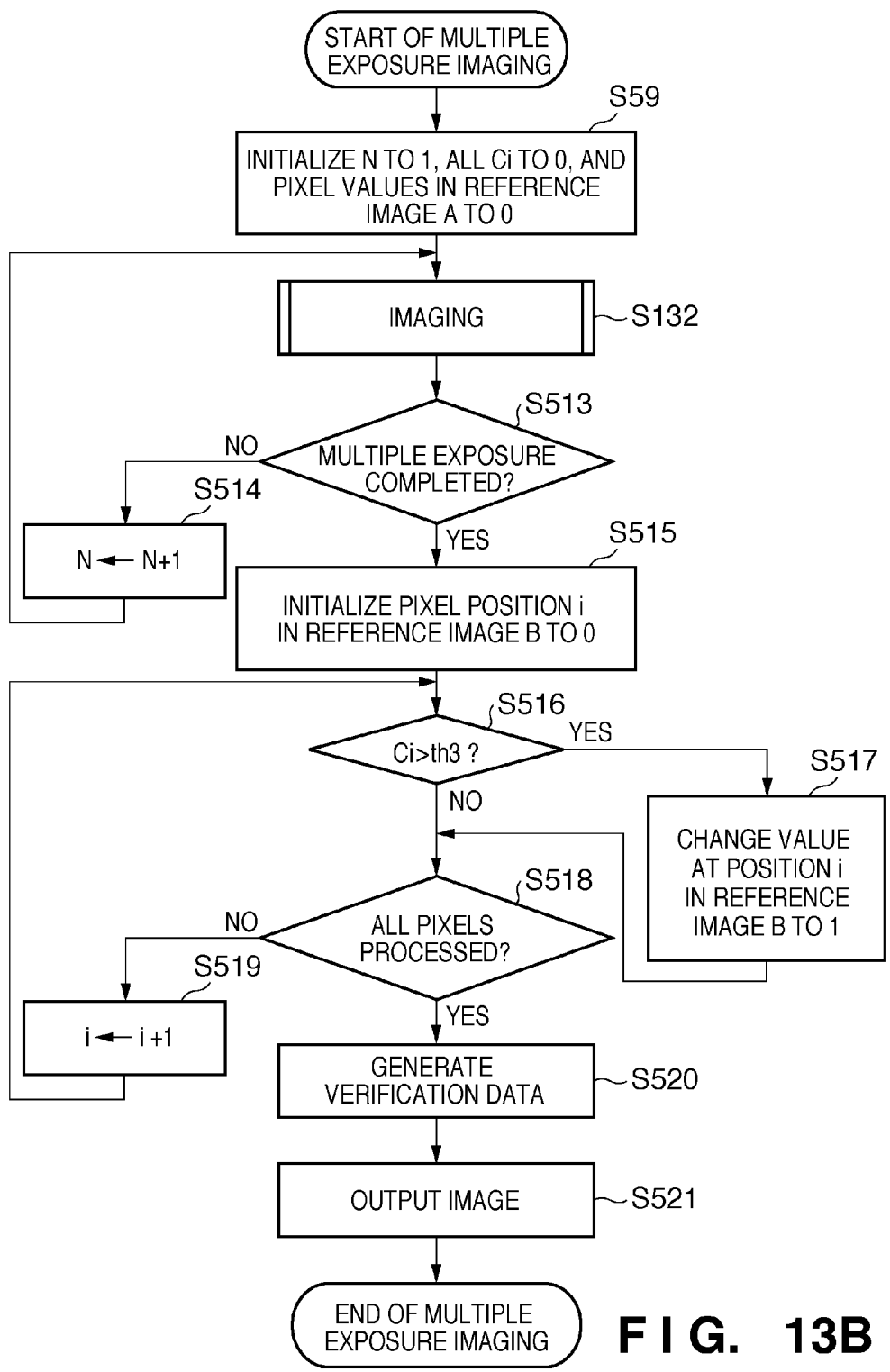

FIGS. 13A and 13B are modifications of FIGS. 5A and 5B described above, respectively.

First is a description of FIG. 13A. The processing in FIG. 13A is identical to the processing described with reference to FIG. 5A, except for processing performed in step S131, and therefore redundant description has been omitted. In step S131, an image is captured with the image generating unit 17 when the user of the image input apparatus 21 operates the operation unit 26.

Figure 14A:
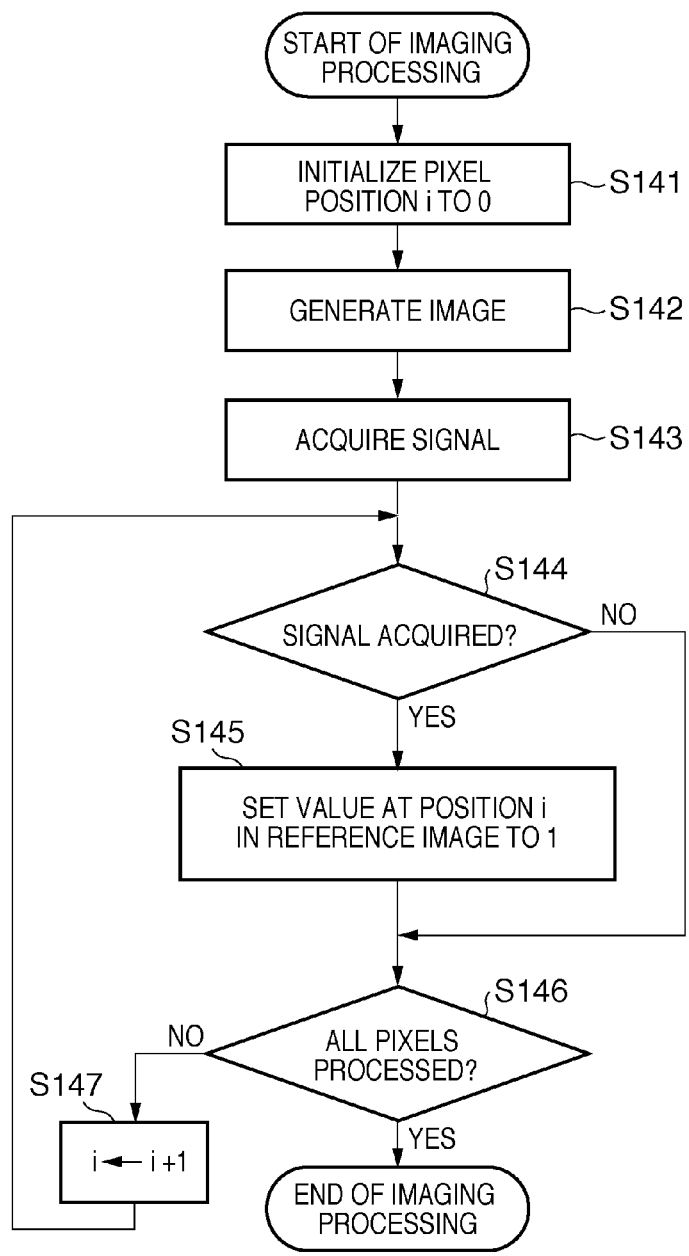
FIGS. 14A and 14B are flowcharts of imaging processing applicable to an embodiment.

Here, the imaging processing of step S131 according to the present modification is described in detail with reference to FIG. 14A. As shown in FIG. 14A, a parameter i indicating the pixel position of the optical sensor is first initialized to 0 (that is, the first pixel) (S141), and the image generating unit 17 generates image data in response to the operation of the operation unit 26 (S142). In the case where the difference between the Nth exposure amount and the N-1th exposure amount at each pixel is greater than a predetermined threshold th, the image generating unit 17 outputs a signal indicating that fact to the reference image generating unit 111. The reference image generating unit 111 attempts to acquire a signal output from the image generating unit 17 (S143) and determines whether or not a signal exists (S144). If a signal exists, the value at the pixel position i in the reference image is set to 1 (S145) and thereafter the procedure proceeds to step S146. If no signal exists, the procedure proceeds to step S146 without changing the value in the reference image. Then, it is determined in step S146 whether or not all the pixels have been processed, and if it has been determined that all the pixels have been processed, the imaging processing ends. If an unprocessed pixel exists, the parameter i indicating the pixel position is incremented by one in step S147 and thereafter the processing from step S144 is repeated.

Next is a description of FIG. 13B. The processing in FIG. 13B is identical to the processing described with reference to FIG. 5B, except for processing performed in step S132, and thus redundant description has been omitted. In step S132, an image is captured with the image generating unit 17 when the user of the image input apparatus 21 operates the operation unit 26.

Figure 14B:
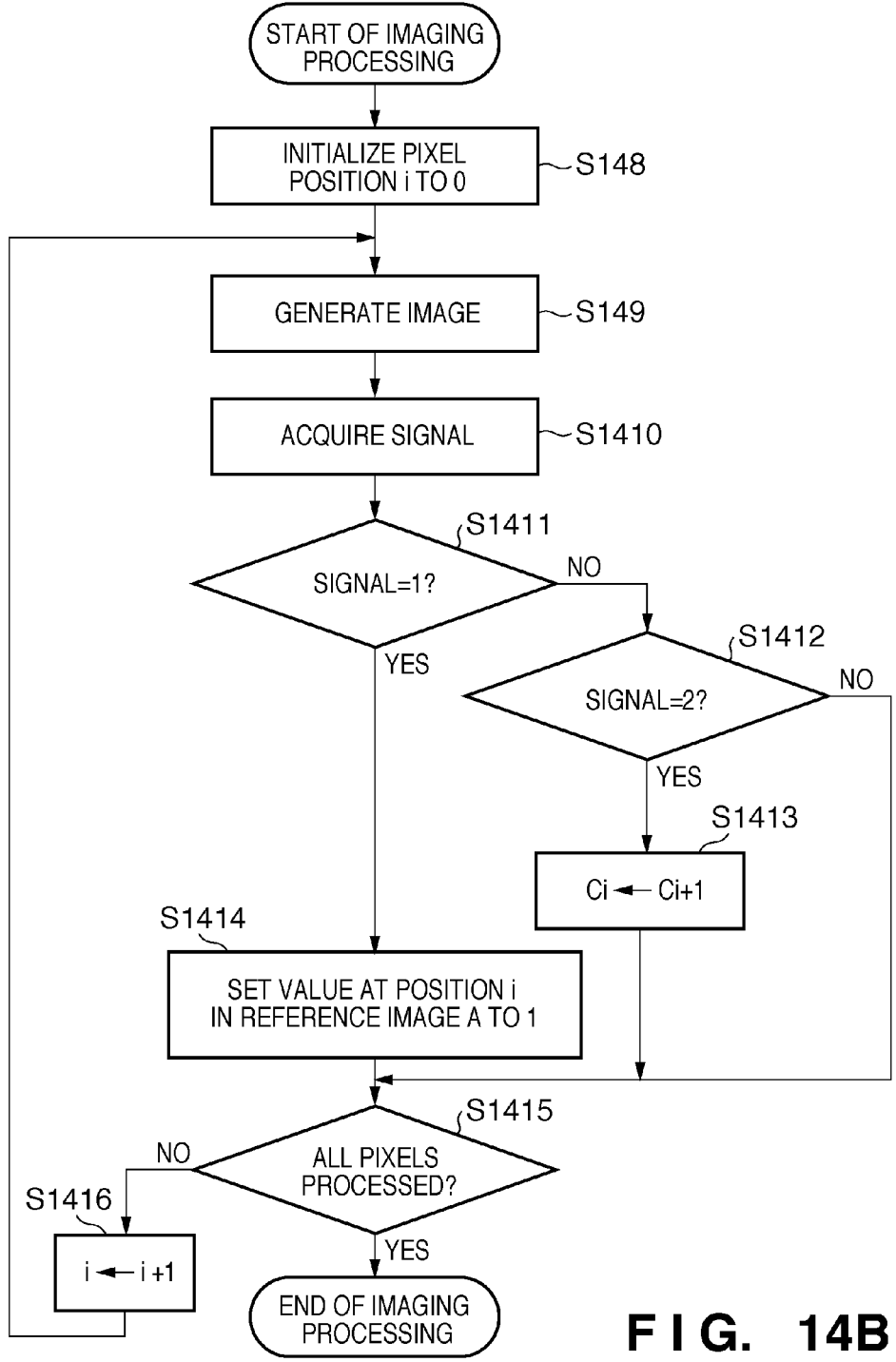

Here, the imaging processing of step S132 according to the present modification is described in detail with reference to FIG. 14B. As shown in FIG. 14B, a parameter i indicating the pixel position of the optical sensor is first initialized to 0 (that is, the first pixel) (S148), and the image generating unit 17 generates image data in response to the operation of the operation unit 26 (S149). In the case where a difference between the Nth exposure amount and the N-1th exposure amount at each pixel is greater than a predetermined threshold th1, the image generating unit 17 outputs a signal with value "1" indicating that fact to the reference image generating unit 111. In the case where the difference between the Nth exposure amount and the N-1th exposure amount is less than or equal to the predetermined threshold th1 and is greater than a predetermined threshold th2, the image generating unit 17 outputs a signal with value "2" indicating that fact to the reference image generating unit 111. The reference image generating unit 111 acquires a signal output from the image generating unit (S1410) and determines whether or not the signal content is "1" (S1411). If the signal is "1", the procedure proceeds to step S1414. In step S1414, the pixel value corresponding to the pixel position i in the reference image A is set to 1. Then, it is determined whether or not all the pixels have been processed (S1415), and if an unprocessed pixel exists, the procedure proceeds to step S1416. In step S1416, the variable i indicating the pixel position is incremented by one and thereafter the procedure proceeds to step S149.

On the other hand, if the signal content is not "1" in step S1411, it is further determined in step S1412 whether or not the signal content is "2". If the signal is "2", the procedure proceeds to step S1413, and otherwise proceeds to step S1415. In step S1413, the number of times the exposure amount has changed, C1, is incremented by one in order to count the number of times the signal has been determined as "2", and thereafter the procedure proceeds to step S1415. If it is determined in step S1415 that all of the pixels have been processed, the imaging processing ends.

Other Embodiments

Note that the present embodiment has been described taking as an example the case where the pixel values are initialized to "0" in steps S51, S59, S515, and S517 and changed to "1" in steps S518, S66, S616, S145, and S1414. However, the present invention is not limited thereto, and pixel values may be initialized to "1" and then changed to "0". Also, pixel values are not limited to "0" and "1", and clearly arbitrary two values are applicable as long as they are distinguishable.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-034105, filed Feb. 18, 2010 and 2010-276389, filed Dec. 10, 2010, which are hereby incorporated by reference herein in their entirety.

What is claimed is:

1. An image input apparatus for acquiring image data in accordance with an exposure amount by exposing an image of an object, comprising:
    a composite image generating unit that generates composite image data using a plurality of exposure amounts for a plurality of exposures;
    a detection unit that detects an exposure change amount at one pixel position in the composite image data, using the plurality of exposure amounts;
    a reference image generating unit that compares an exposure change amount detected at each pixel position by the detection unit with a preset threshold, and generates reference image data composed of data pieces for distinguishing a pixel position at which the exposure change amount exceeds the threshold from the other pixel positions;
    a verification data generating unit that generates verification data for determining whether or not alteration has been made from the composite image data obtained by the composite image generating unit and the reference image data obtained by the reference image generating unit; and
    an output unit that outputs the composite image data, the reference image data, and the verification data.

2. The image input apparatus according to claim 1, wherein if an exposure amount at the pixel position i in exposure image data obtained from an Nth exposure is given as Ei(N), the threshold is given as th1, and an average of exposure amounts Ei from Ei(1) to Ei(N) is given as AVE(N),
    the detection unit initializes the reference image data so that all pixels in the reference image data have a value "0" in a case of multiple exposure performed by a multiple exposure unit, and calculates an exposure change amount Di at a pixel position i in the exposure image data obtained from the Nth exposure, using $Di=|Ei(N)-Ei(N-1)|$ or $Di=|Ei(N)-AVE(Ei(N-1))|$ and if Di>th1 is satisfied, a pixel value at the pixel position i in the reference image data is changed to "1".

3. The image input apparatus according to claim 1, wherein if Ei(N) is an exposure amount at the pixel position i in exposure image data obtained from an Nth exposure is given as Ei(N) and the threshold is given as th,
    the detection unit initializes the reference image data so that all pixels in the reference image data have a value "0" in a case of multiple exposure performed by a multiple exposure unit, and calculates an exposure change amount Di at a pixel position i in the exposure image data obtained from the Nth exposure, using $Di=Ei(N)/Ei(N-1)$ and if |Di-1|>th is satisfied, a pixel value at the pixel position i in the reference image data is changed to "1".

4. The image input apparatus according to claim 2, further comprising:
    a second reference image generating unit that obtains the number of times Ci that th2<Di≦th1 has been satisfied for each pixel position i until the number of exposures reaches a total number of exposures, where th2 is a threshold smaller than the threshold th1, and after the numbers of times Ci for the total number of exposures have been determined, generates second reference image data composed of data pieces for distinguishing a pixel position where Ci>th3 is satisfied between Ci and a preset threshold th3 from the other pixel positions,
    wherein the verification data generating unit generates the verification data by also referencing the second reference image data generated by the second reference image generating unit.

5. The image input apparatus according to claim 1, wherein the composite image generating unit includes:
    an image generating unit that generates a single image data piece using an exposure amount for a single exposure; and
    an image composition unit that generates a single composite image data piece from a predetermined number of image data pieces generated by the image generating unit.

6. The image input apparatus according to claim 1, wherein the composite image generating unit accumulates an exposure amount for each exposure per pixel and outputs, as the composite image data, a single image data piece generated using the accumulated exposure amount for a predetermined number of exposures.

7. An image verification apparatus for performing verification processing on image data, comprising:
    a first determination unit that extracts verification data from an image data file targeted for verification and determines whether or not alteration has been made to the image data file based on the verification data;
    a second determination unit that, if the first determination unit has determined that no alteration has been made, determines whether or not the image data file targeted for verification includes reference image data aside from image data targeted for verification and, if it is determined that the reference image data does not exist, determines the image data targeted for verification as image data obtained from a single exposure and, if it is determined that the reference image data exists, determines the image data targeted for verification as composite image data obtained from multiple exposure; and
    a display unit that visualizes and displays the reference image data if the second determination unit has determined that the image data file targeted for verification includes the reference image data.

8. A control method for an image input apparatus for acquiring image data in accordance with exposure image data by exposing an image of an object, the control method comprising:
- a composite image generating step of generating composite image data using a plurality of exposure amounts for a plurality of exposures;
- a detection step of detecting an exposure change amount at one pixel position in the composite image data, using the plurality of exposure amounts;
- a reference image generating step of comparing an exposure change amount detected at each pixel position in the detection step with a preset threshold and generating reference image data composed of data pieces for distinguishing a pixel position at which the exposure change amount exceeds the threshold from the other pixel positions;
- a verification data generating step of generating verification data for determining whether or not alteration has been made from the composite image data obtained in the composite image generating step and the reference image data obtained in the reference image generating step; and
- an output step of outputting the composite image data, the reference image data, and the verification data.

9. A control method for an image verification apparatus for performing verification processing on image data, the control method comprising:
- a first determination step of extracting verification data from an image data file targeted for verification and determining whether or not alteration has been made to the image data file based on the verification data;
- a second determination step of, if it has been determined in the first determination step that no alteration had been made, determining whether or not the image data file targeted for verification includes reference image data aside from image data targeted for verification and, if it is determined that the reference image data does not exist, determining the image data targeted for verification as image data obtained from a single exposure and, if it is determined that the reference image data exists, determining the image data targeted for verification as image data obtained from multiple exposure; and
- a display step of visualizing and displaying the reference image data if it has been determined in the second determination step that the image data file targeted for verification includes the reference image data.

10. A non-transitory computer-readable storage medium storing a program for causing a computer to read and execute the program and to thereby execute the steps according to claim 8.

11. A non-transitory computer-readable storage medium storing a program for causing a computer to read and execute the program and to thereby execute the steps according to claim 9.

* * * * *